United States Patent
Gerendas

(10) Patent No.: US 9,016,067 B2
(45) Date of Patent: Apr. 28, 2015

(54) GAS-TURBINE COMBUSTION CHAMBER WITH A COOLING-AIR SUPPLY DEVICE

(75) Inventor: Miklos Gerendas, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 669 days.

(21) Appl. No.: 13/275,805

(22) Filed: Oct. 18, 2011

(65) Prior Publication Data

US 2012/0117973 A1    May 17, 2012

(30) Foreign Application Priority Data

Nov. 17, 2010 (DE) .......................... 10 2010 051 638

(51) Int. Cl.
*F02C 1/00* (2006.01)
*F23R 3/06* (2006.01)

(52) U.S. Cl.
CPC .......... *F23R 3/06* (2013.01); *F23R 2900/03041* (2013.01); *F23R 2900/03042* (2013.01); *Y02T 50/675* (2013.01)

(58) Field of Classification Search
CPC ............. F23R 3/06; F23R 2900/03041; F23R 2900/03042; Y02T 50/675
USPC .................................................. 60/752–760
See application file for complete search history.

(56) References Cited

U.S. PATENT DOCUMENTS

| | | | |
|---|---|---|---|
| 4,080,095 A | 3/1978 | Stahl | |
| 4,302,940 A * | 12/1981 | Meginnis | ......................... 60/754 |
| 5,584,651 A | 12/1996 | Pietraszkiewicz et al. | |
| 5,738,493 A | 4/1998 | Lee et al. | |
| 6,145,319 A | 11/2000 | Burns et al. | |
| 6,237,344 B1 | 5/2001 | Lee | |
| 6,282,905 B1 * | 9/2001 | Sato et al. | ......................... 60/752 |
| 6,427,446 B1 * | 8/2002 | Kraft et al. | ......................... 60/737 |
| 7,658,590 B1 | 2/2010 | Spanks | |
| 8,387,396 B2 * | 3/2013 | Chen et al. | ......................... 60/755 |
| 2008/0166220 A1 | 7/2008 | Chen et al. | |
| 2013/0098063 A1 * | 4/2013 | Mizukami et al. | ............. 60/785 |

FOREIGN PATENT DOCUMENTS

| | | |
|---|---|---|
| EP | 1475567 | 11/2004 |
| EP | 1803897 | 7/2007 |
| EP | 2075410 | 7/2009 |
| GB | 2412411 | 9/2005 |

OTHER PUBLICATIONS

German Search Report dated Jun. 14, 2011 from counterpart foreign application.

* cited by examiner

*Primary Examiner* — Ehud Gartenberg
*Assistant Examiner* — Arun Goyal
(74) *Attorney, Agent, or Firm* — Timothy J. Klima; Shuttleworth & Ingersoll, PLC

(57) ABSTRACT

A gas-turbine combustion chamber has a cooling-air supply device delivering cooling air to a combustion chamber wall 6 to be cooled. The cooling-air supply device includes at least one air-supply duct 8 which, in respect of its flow axis, is arranged vertically to the combustion chamber wall 6, with the air-supply duct 8 being flow-connected to at least one cooling duct 9. The air-supply duct 8 forms a throttle and has a smaller diameter than the cooling duct 9. The cooling duct 9 issues at a shallow angle, relative to its flow axis, to the surface of the combustion chamber wall 6 in a recess 10 of the combustion chamber wall 6, with the cooling duct 9 being designed to impart a swirl to the air flowing through it.

20 Claims, 4 Drawing Sheets

GAS-TURBINE COMBUSTION CHAMBER WITH A COOLING-AIR SUPPLY DEVICE

Figure 1:
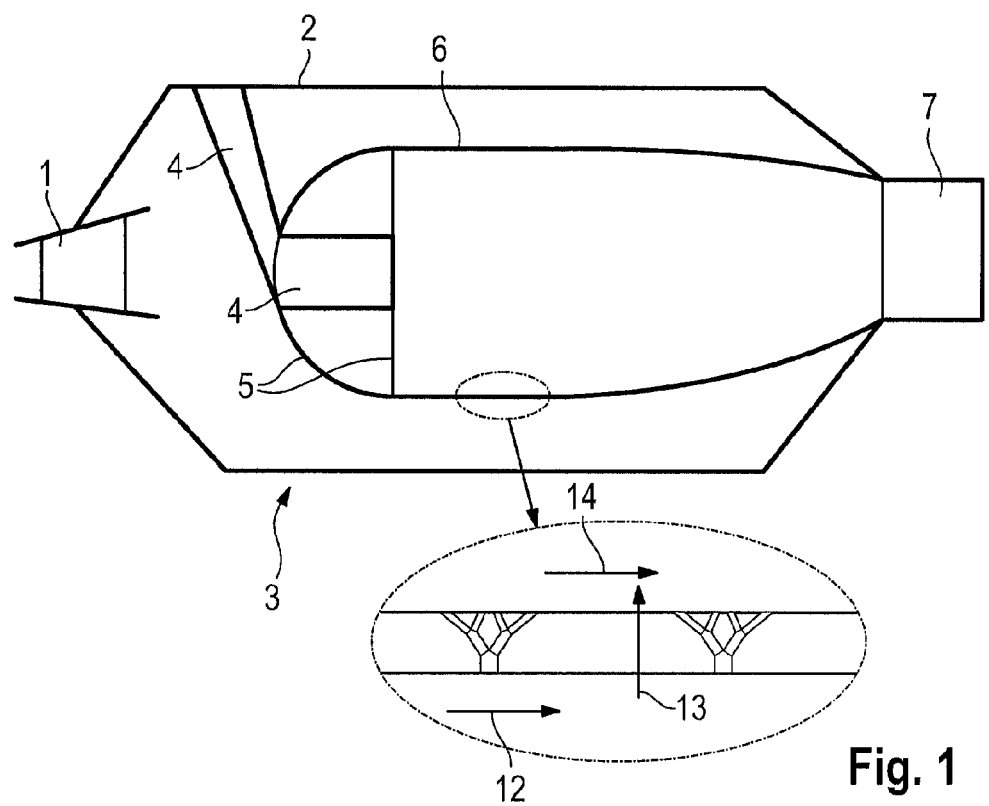

This application claims priority to German Patent Application DE102010051638.4 filed Nov. 17, 2010, the entirety of which is incorporated by reference herein.

This invention relates to a gas-turbine combustion chamber with a cooling-air supply device delivering cooling air to a combustion chamber wall to be cooled.

A wide variety of most different designs for depositing the air supplied through branching recesses of the combustion chamber wall onto the wall in the form of a film are known from the state of the art. The supply of the cooling air itself was not given primary consideration here.

In all designs with progressively decreasing flow cross-section, there is an inherent risk of clogging, since aircraft engines are operated without an air filter and hence sand and dust in the air can also flow through the engine. The coarse sand grains would remain stuck at the first branch, and the finer dust particles would collect more deeply inside the wall at one of the following branch points.

Inspection of the wall for clogging which is located not on the surface but in the wall itself is difficult. Cleaning is just as much a problem since only very small openings are provided on the surface on the hot gas side, and these can, during flushing with air, water or another cleaning agent, exert only a slight force on the sand grain blocking the cooling airflow inside the cooling duct due to the many deflections, so that the cleaning effect remains limited.

If by contrast the cross-section is enlarged or at least remains constant at each branch point, the flow velocity is continually reduced at each branch point and the cooling effect decreases more and more with each branch stage.

If the duct is given a helix shape, as proposed in EP 1 803 897 A2, a swirled flow is obtained which despite the large flow cross-section leads to a good cooling effect in the cooling duct, but the film cooling effect on the side of the component facing the hot gas is also an important part of the overall cooling concept for a combustion chamber wall. Due to the swirl imparted to the flow, however, the air flowing out of a helix, without any further measures, onto the side of the combustion chamber or the turbine blade facing the hot gas becomes mixed very quickly with this hot gas, and so the film cooling effect remains low.

The discharging of a cooling duct at an angle substantially vertical to the surface likewise leads to a very low cooling effect on the hot gas side, since as a result the cooling air is moved well clear of the component, and the mixing with the hot gas is furthered by the generation of turbulence.

The present invention, in a broad aspect, provides a cooling-air supply device for a gas-turbine combustion chamber, which while being simply designed and operationally safe, in particular avoids the risk of clogging by foreign particles.

It is thus provided in accordance with the present invention that the cooling-air supply device includes at least one air-supply duct which, in respect of its center axis or flow axis, is arranged vertically to the wall of the combustion chamber or to a tangent surface in the area of the exit opening of the air-supply duct through the wall of the combustion chamber. In accordance with the invention, the term "flow axis" is understood as either the center axis of a straight and tube-like duct or the three-dimensional centerline of the flow duct.

It is furthermore provided in accordance with the invention that the air-supply duct is flow-connected to at least one cooling duct and hence discharges into the latter. The air-supply duct here has a smaller diameter than the at least one following cooling duct. The air-supply duct thus forms a throttle or throttle point.

It is also provided in accordance with the invention that the cooling duct discharges at a shallow angle, relative to its flow axis, to the surface of the wall in a recess of the wall. The flow is thus guided at a shallow angle to the wall of the combustion chamber. It is furthermore provided in accordance with the invention that the cooling duct is designed to impart a swirl to the air flowing through it.

In a particularly favorable embodiment of the invention, it is provided that the swirl is created either by an axial offset of the flow axes of the air-supply duct and of the cooling duct, or by a helix shape or screw-like design of the cooling duct itself.

In a further particularly favorable embodiment of the invention, it is provided that two cooling ducts are arranged adjacently to one another and at an acute angle to one another relative to their flow axes. The flows passing through the two cooling ducts thus run convergently through two recesses arranged adjacently to one another in the combustion chamber wall, as will be described in the following. The two adjacent cooling ducts are preferably designed to impart an opposite-direction swirl to the air flowing through them. It is particularly favorable here if the swirl directions of the two airflows are designed such that the air quantities supplied through the cooling ducts and flowing out of the recesses contact the wall of the combustion chamber.

The shallow angle of the mouth of the cooling duct is preferably between 5° and 45°, better still between 10° and 30°. An angle of 20° is particularly favored. The acute angle between the adjacent cooling ducts is more favorable less than 45° in accordance with the invention.

In a further particularly favorable embodiment of the invention, the distance of the rims of the recesses of the wall through which the cooling ducts discharge is less than four diameters of the openings or 2×(diameter of first opening+diameter of second opening).

To improve the inflow, it is particularly favorable if the angle bisector is arranged at an acute angle between the two cooling ducts and substantially in the flow direction of a flow of gases along the combustion chamber wall to be cooled.

In accordance with the invention, the air is thus supplied through a very narrow cross-section, entering the wall substantially vertically to the surface, into a slightly larger cooling duct in such a way that a swirled flow is created, where the swirl results from an offset of the axes of the very narrow cross-section and of the continuing duct, the continuing duct discharges at a shallow angle on the side facing the hot gas through the surface of the component, two openings of continuing ducts always discharge close to one another and, in doing so, describe by their axes an acute angle at the outlet, and the opposite-direction swirls of two exit openings positioned close to one another behave such that the air in the area between the two exit openings flows in the direction of the wall to be cooled.

A shallow angle to the surface is, in accordance with the invention, preferably an angle between 5° and 45°, better 10° to 30°, ideally 20°. Two openings are positioned close to one another when the distance between the rims of the openings is less than four diameters of the openings or 2×(diameter of first opening+diameter of second opening). An acute angle between the axes is an angle of less than 45°.

The angle bisector of an acute angle between the two cooling ducts issuing close to one another is substantially aligned with the flow direction of the hot gas.

The openings positioned close to one another can be supplied with air from the same very narrow cross-section or from two adjacent very narrow cross-sections. The continuing duct can have one or two outlets to the side facing the hot gas.

If the air flows on through two very narrow cross-sections in two continuing ducts, where each duct has only one outlet, and if the air quantities are to interact positively with one another after exiting on the hot gas side of the wall, then the axes of the two very narrow cross-sections must be arranged on the outside of the two continuing ducts arranged substantially in a V shape so that the air issuing from the ducts flows between the ducts in the direction of the wall to be cooled.

If the air flows through two substantially helix-shaped ducts which generate the swirl by the helix and not by the axis offset of the very narrow cross-section, then the rotary direction of the helices must be opposite to the two ducts discharging close to one another on the side facing the hot gas, and aligned such that the air flowing out of the ducts flows between the ducts in the direction of the wall to be cooled.

If the swirling flows from the two outlets of the same continuing duct are to interact with one another, it is then possible, for example, that a very narrow cross-section vertical to the surface impacts a continuing duct running transversely in the wall in such a way that a swirling flow is obtained due to the offset of the axes of the very narrow cross-section and of the continuing duct, the air can flow off in two directions through the transversely running continuing duct and due to the bent shape of the continuing duct, pass through the surface in two openings that are close to one another on the side of the component facing the hot gas, where the swirls of the two airflows then act towards one another such that the air flows between the two openings in the direction of the component to be cooled. To do so, the axis of the very narrow cross-section must be displaced relative to the axis of the transversely running duct such that the very narrow cross-section is moved in the direction of the opening on the hot gas side.

If the swirling flows from the two outlets of adjacent continuing ducts are to interact with one another, it is then possible, for example, that a very narrow cross-section vertical to the surface impacts a continuing duct running transversely in the wall in such a way that a swirling flow is obtained due to the offset of the axes of the very narrow cross-section and of the continuing duct, the air can flow off in two directions through the transversely running continuing duct and due to the shape of the continuing duct pass through the surface in two openings on the side of the component facing the hot gas and so arranged that an opening connected to an adjacent very narrow cross-section comes to rest close to the opening just described, where the swirls of the two airflows then act towards one another such that the air flows between the two openings in the direction of the component to be cooled. To do so, the axis of the very narrow cross-section must be displaced relative to the axis of the transversely running duct such that the very narrow cross-section is moved away from the opening on the hot gas side.

The first part of the flow duct forming the very narrow cross-section is with its axis substantially locally vertical to the surface of the wall penetrated by the flow duct.

The first part of the flow duct forming the very narrow cross-section is situated in a plane at an angle to the plane of the second part of the flow duct.

The cooling openings in accordance with the invention are not provided retrospectively in the wall material, whether it is a combustion chamber or another component of a gas turbine, but are produced together with the wall penetrated by the opening. This can be achieved for example by a layer-type structure of the component by laser welding using metal powder or by casting of metal in a mold made by laser sintering from ceramic powder. Alternatively, several metal sheets can be appropriately processed and then laminated to one another.

The solution according to the present invention features the following advantages:

Due to the outside throttle point in the very narrow cross-section, clogging is visible from the outside. The swirl in the cooling opening increases the heat transfer. The interaction of two adjacent cooling-air openings with two opposingly rotating swirls, in the manner that the air moves between the two swirls in the direction of the wall to be cooled, increases the film cooling effect. Both aspects of a cooling concept are thus improved.

Figure 4:
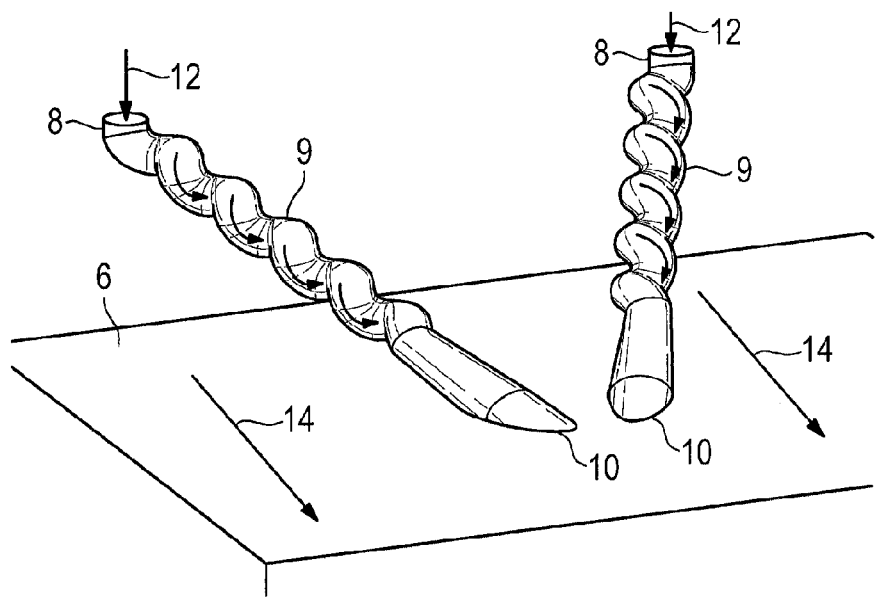
Figure 5:
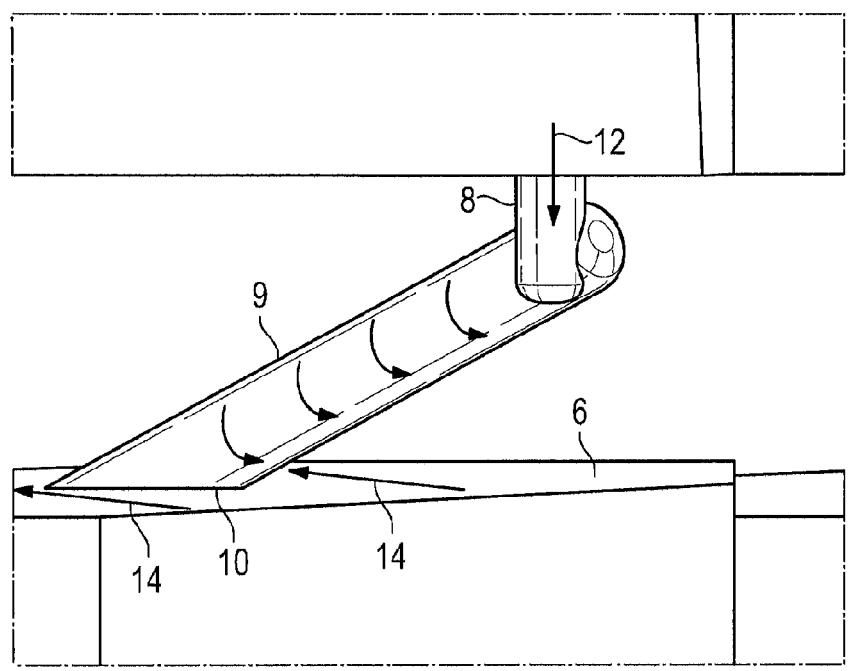
Figure 6:
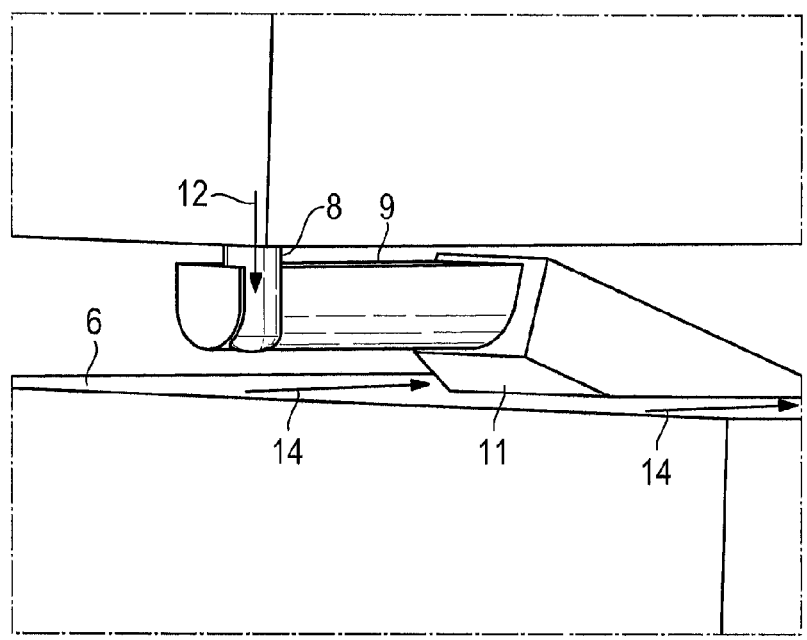
Figure 7:
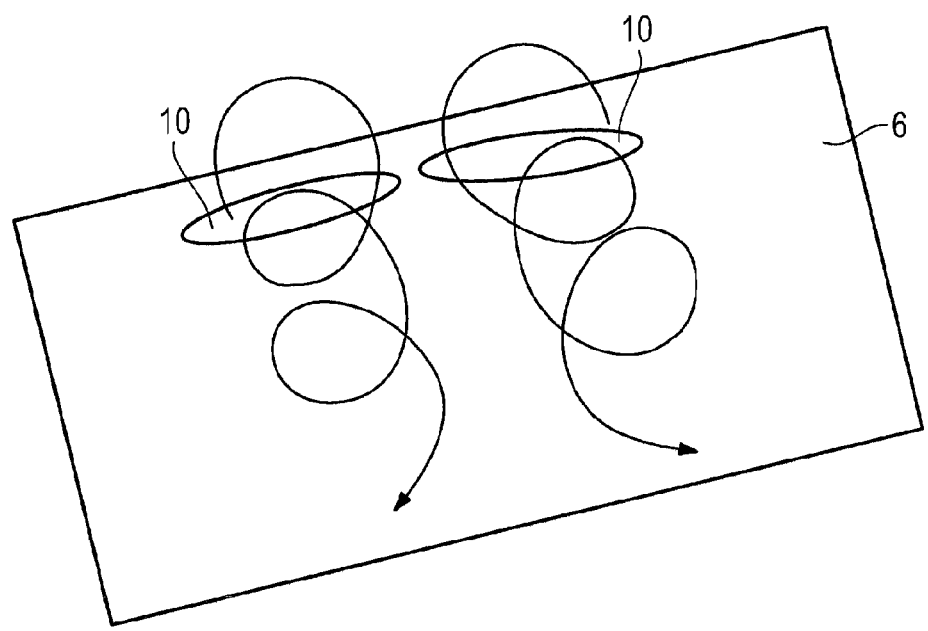

The present invention is more fully described in light of the accompanying drawings showing preferred embodiments. In the drawings, FIG. 1 (Prior Art) shows a schematic sectional view of a gas-turbine combustion chamber, FIG. 2 is a perspective partial representation of an exemplary embodiment with opposite-direction swirl from adjacent cooling channels, FIGS. 3A, B are perspective partial representations with opposite-direction swirl from both ends of a cooling-duct arrangement of a further exemplary embodiment, FIG. 4 is a perspective partial representation of a further exemplary embodiment with opposite-direction swirl from two opposite-direction helix-shaped cooling ducts, FIG. 5 is a perspective partial representation of a further exemplary embodiment with swirl in a cylindrical effusion opening, FIG. 6 is a perspective partial view of a further exemplary embodiment with a cooling duct extending parallelly in the wall, and FIG. 7 is a simplified representation of the principle of the interaction of the swirling flows of adjacent cooling ducts.

Figure 2:
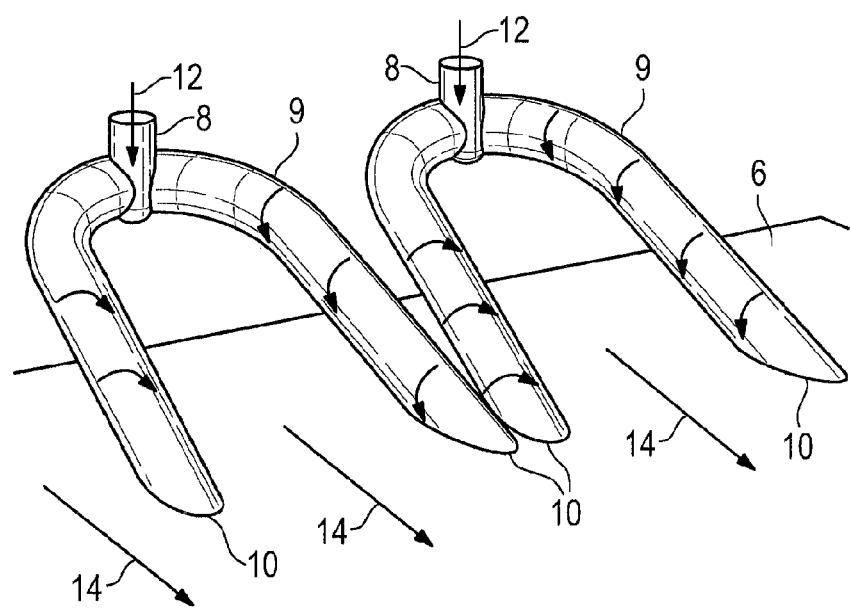

FIG. 1 (Prior Art) shows in a schematic view a cross-section of a gas-turbine combustion chamber according to the state of the art. It shows in schematic form compressor outlet blades 1, a combustion chamber outer casing 2 and a combustion chamber inner casing 3. Reference numeral 4 indicates a burner with arm and head, reference numeral 5 a combustion chamber head adjoined by a combustion chamber wall 6 through which the flow passes to turbine inlet blades 7. An enlarged detail shows a tapering cross-section according to GB 2 412 411 A with constant speed.

In the design examples described in the following, identical parts are provided with the same reference numerals.

In all design examples, the supplied cooling air first flows through an air-supply duct 8 arranged vertically to the combustion chamber wall 6, as indicated by the flow arrows shown in the figures. The respective air-supply duct 8 is provided with a smaller cross-section than a cooling duct adjoining it, so that the air-supply duct 8 forms a throttle point for the air flowing on into the at least one cooling duct 9.

The cooling ducts 9 and the air-supply duct 8 are each designed such that a swirl results in the airflow, as indicated by the arrows in the figures.

The figures furthermore show the combustion chamber wall 6 of the combustion chamber and the hot gas airflow passing along the wall. The result is that the cooling ducts 9 are each arranged at a shallow angle to the combustion chamber wall 6. Furthermore, adjacent cooling ducts 9 are arranged at an acute angle to one another such that the swirled airflows exiting each converge and meet. The swirl direction is here selected such that the airflow, for example as shown in FIG. 7, contacts the combustion chamber wall 6.

FIG. 2 shows a design example with opposite-direction swirl from two adjacent very narrow cross-sections (air-supply ducts 8) with the axis of the very narrow cross-section shifted downstream relative to the transversely running duct (cooling duct 9) in the combustion chamber wall 6. The result is that the illustrations in FIGS. 2 to 6 are in each case schematic and perspective representations. Thus the inner surface of the air-supply duct 8 and/or of the cooling duct 9 and/or the air in the cooling duct 9 are shown. The exterior of the combustion chamber wall 6 was removed on the side facing away from the hot gas. The result is that two substantially U-shaped cooling ducts 9 are provided.

Figure 3A:
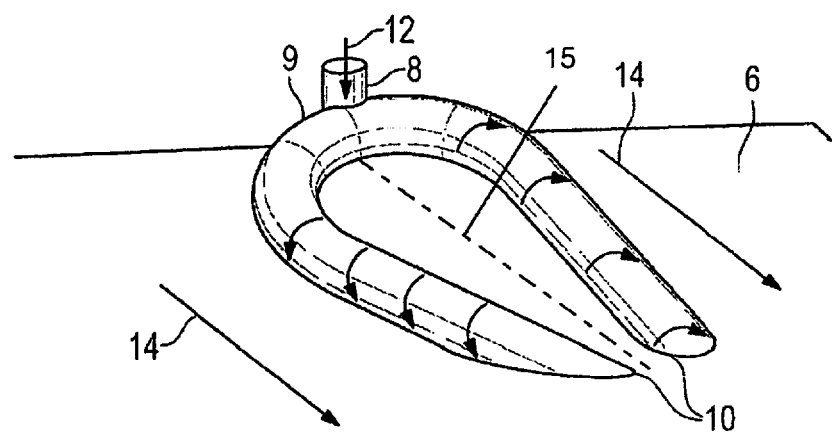
Figure 3B:
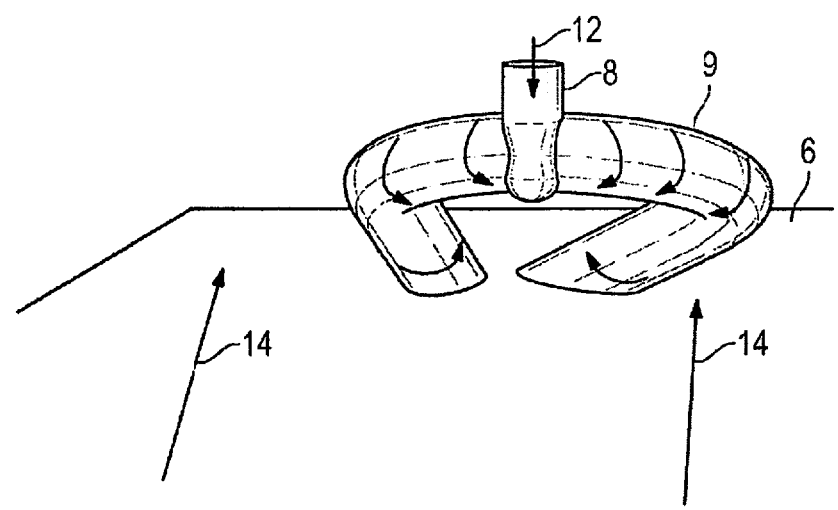

In the design example of FIGS. 3A and 3B, the two ends of the double U-shaped cooling duct face one another at an acute angle. The result is an opposite-direction swirl from both ends of the cooling ducts 9, supplied through the same very narrow cross-section (air-supply duct 8) with the axis of the very narrow cross-section (air-supply duct 8) shifted upstream relative to the transversely running area of the cooling duct 9 in the wall (viewed from downstream). An angle bisector 15 of an acute angle between the two cooling ducts issuing close to one another is substantially aligned with the flow direction 14 of the hot gas.

FIG. 3B shows the opposite-direction swirl from both ends of the cooling duct 9, supplied through the same very narrow cross-section of the cooling duct 8 with the axis of the air-supply duct 8 of the very narrow cross-section shifted upstream relative to the transversely running area of the cooling ducts 9 in the wall (viewed from upstream).

FIG. 4 shows a further design example with opposite-direction swirl from two opposite-direction helices forming the cooling ducts 9. With a helix-shaped cooling duct 9, the swirl is not generated by a skewed inlet opening, but is determined by the rotary direction of the helix. A skewed inlet opening can however support the formation of a swirled flow in the cooling duct 9. Both exit openings 10 (recesses of the combustion chamber wall 6) are aligned at a low angle to the hot gas flow (viewed from downstream).

FIG. 5 shows a design example with a swirl in a cylindrical effusion opening 10 (recess of the combustion chamber wall 6) with skewed inlet opening as the very narrow cross-section (air-supply duct 8). In accordance with the invention, two openings with opposite-direction swirl and aligned at a low angle to the hot gas flow are combined such that the flow is between the openings in the direction of the combustion chamber wall 6 to be cooled. This is achieved when the supply openings are arranged on the outside of (i.e. not between) the two continuing cooling ducts 9. FIG. 5 shows a view from upstream.

FIG. 6 shows a further design example with a variant having a continuing cooling duct 9 extending in a parallel manner in the wall, with skewed inlet opening as the very narrow cross-section and inclined outlet diffuser. In accordance with the invention, two cooling ducts 9 with opposite-direction swirl as per FIG. 6 and aligned at a low angle to the hot gas flow are combined such that the flow is between the openings and in the direction of the wall 6 to be cooled. This is achieved when the supply openings 10 are arranged on the outside of (i.e. not between) the two continuing cooling ducts 9. The cooling duct 9 does not necessarily have to be round. FIG. 6 shows a geometry variant permitting joining of the wall made of two metal sheets. In this case, first the continuing cooling duct 9 is made in the one surface of a metal sheet and after joining, e.g. by brazing or welding, the skewed inlet opening (air-supply duct 8) is provided, e.g. by drilling or electrical discharge machining through the second sheet. The outlet diffuser 11 can be provided in the other side of the first sheet at a suitable time into the individual sheet or into the already joined lamination of two sheets. FIG. 6 shows a view from upstream.

FIG. 7 shows the principle of the interaction of two adjacent openings 10 with advantageous formation of the swirl: due to the swirl the air flows between the two openings 10 in the direction of the wall 6 to be cooled and hence contacts the wall to be cooled even at a steeper exit angle or at higher discharge rates.

LIST OF REFERENCE NUMERALS

1 Compressor outlet blades
2 Combustion chamber outer casing
3 Combustion chamber inner casing
4 Burner with arm and head
5 Combustion chamber head
6 Combustion chamber wall
7 Turbine inlet blades
8 Air-supply duct
9 Cooling duct
10 Outlet of cooling duct (recess of combustion chamber wall 6)
11 Diffuser-shaped outlet of cooling duct/outlet diffuser
12 Cooling airflow
13 Direction of flow through cooling duct
14 Hot gas flow

What is claimed is:

1. A gas-turbine combustion chamber, comprising:
a combustion chamber wall to be cooled;
a cooling-air supply device including:
at least one air-supply duct which, in respect of its flow axis, is arranged essentially vertically to the combustion chamber wall,
the air-supply duct being flow-connected to a first cooling duct,
the air-supply duct having a smaller cross-section than the first cooling duct to form a throttle between the first cooling duct and the combustion chamber wall,
the first cooling duct issuing at a shallow angle, relative to its flow axis, to a surface of the combustion chamber wall in a recess of the combustion chamber wall, and
the first cooling duct being configured to impart a swirl to an airflow flowing through the first cooling duct;
a second cooling duct arranged adjacently to the first cooling duct and connected to said air supply duct for supplying an airflow through the second cooling duct, each of the first and second cooling ducts having an exit opening positioned at a same axial position in a hot gas flow direction, each of the exit openings having an exit flow axis, the exit flow axes of the exit openings of the first and second cooling ducts being arranged at an acute angle to one another from a vertex positioned on a common bisector positioned midway between the exit openings, the common bisector substantially aligned with the hot gas flow direction.

2. The gas-turbine combustion chamber of claim 1, wherein the first and second cooling ducts are configured to impart opposite-direction swirls to the airflows flowing through them.

3. The gas-turbine combustion chamber of claim 2, wherein the shallow angle is between 5° and 45°.

4. The gas-turbine combustion chamber of claim 3, wherein the acute angle between the first and second cooling ducts is less than 45°.

5. The gas-turbine combustion chamber of claim 4, wherein a distance between rims of the recesses of the combustion chamber wall through which the cooling ducts discharge is less than 2×(diameter of first opening+diameter of second opening).

6. The gas-turbine combustion chamber of claim 5, wherein swirl directions of the airflows through the first and second cooling ducts are configured for supplying exiting cooling air to the combustion chamber wall.

7. The gas-turbine combustion chamber of claim 6, wherein at least one of the opposite-direction swirls is created by an axial offset of the axes of the air-supply duct and at least one chosen from the first and the second cooling ducts.

8. The gas-turbine combustion chamber of claim 6, wherein at least one of the opposite-direction swirls is created by a helix shape of at least one chosen from the first and the second cooling ducts.

9. The gas-turbine combustion chamber of claim 3, wherein the shallow angle is between 10° and 30°.

10. The gas-turbine combustion chamber of claim 3, wherein the shallow angle is approximately 20°.

11. The gas-turbine combustion chamber of claim 1, wherein the acute angle between the first and second cooling ducts is less than 45°.

12. The gas-turbine combustion chamber of claim 1, wherein a distance between rims of the recesses of the combustion chamber wall through which the first and second cooling ducts discharge is less than 2×(diameter of first opening+diameter of second opening).

13. The gas-turbine combustion chamber of claim 1, wherein the airflows through the first and second cooling ducts each have a swirl which is configured for supplying exiting cooling air to the combustion chamber wall.

14. The gas-turbine combustion chamber of claim 1, wherein the swirl is created by an axial offset of the axes of the air-supply duct and of at least one chosen from the first and second cooling ducts.

15. The gas-turbine combustion chamber of claim 1, wherein the swirl is created by a helix shape of first cooling duct.

16. The gas-turbine combustion chamber of claim 1, wherein the shallow angle is between 5° and 45°.

17. The gas-turbine combustion chamber of claim 16, wherein the shallow angle is between 10° and 30°.

18. The gas-turbine combustion chamber of claim 1, wherein the flow axis of the air supply duct is offset from the flow axis of the first cooling duct and an outer circumference of at least a portion of the air supply duct lies outside of an outer circumference of the first cooling duct.

19. The gas-turbine combustion chamber of claim 1, wherein the air-supply duct is flow-connected to the second cooling duct.

20. The gas-turbine combustion chamber of claim 19, wherein the second cooling duct has a same cross-section as the first cooling duct and the air-supply duct is centrally positioned between the first and second cooling ducts to supply air to both the first and second cooling ducts.

* * * * *